United States Patent
Furushige et al.

(10) Patent No.: US 9,092,174 B2
(45) Date of Patent: Jul. 28, 2015

(54) PERIPHERAL DEVICE, RECORDING MEDIUM, AND DATA PROCESSING METHOD

(71) Applicant: KYOCERA Document Solutions Inc., Osaka-shi, Osaka (JP)

(72) Inventors: Katsuji Furushige, Osaka (JP); Masaya Okuda, Osaka (JP); Masato Hirota, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/554,070

(22) Filed: Nov. 26, 2014

(65) Prior Publication Data

US 2015/0153984 A1 Jun. 4, 2015

(30) Foreign Application Priority Data

Nov. 29, 2013 (JP) ................................. 2013-248549

(51) Int. Cl.
*G06F 15/00* (2006.01)
*G06F 3/12* (2006.01)
*G06K 1/00* (2006.01)

(52) U.S. Cl.
CPC ............ *G06F 3/1261* (2013.01); *G06F 3/1207* (2013.01); *G06F 3/1288* (2013.01); *G06F 3/1221* (2013.01)

(58) Field of Classification Search
CPC .... G06F 3/1261; G06F 3/1207; G06F 3/1288; G06F 3/1221; G06K 15/02
USPC .................................. 358/1.1, 1.13, 1.14, 1.15
See application file for complete search history.

(56) References Cited

U.S. PATENT DOCUMENTS 8,289,555 B2 * 10/2012 Kawai .......................... 358/1.15
2010/0188687 A1 * 7/2010 Fukano et al. ............... 358/1.15

FOREIGN PATENT DOCUMENTS

JP 2009003586 A 1/2009

* cited by examiner

*Primary Examiner* — Douglas Tran

(57) ABSTRACT

A peripheral device connectable to a terminal via a network includes an alternate-device search unit, an alternate-device data transmission unit, and an alternate-device data transmission notification unit. The alternate-device search unit searches for an alternate peripheral device in an operating mode in the neighborhood of the peripheral device when the peripheral device is in a power saving mode upon receiving data to be processed from the terminal. When the alternate-device search unit locates the alternate peripheral device in the operation mode, the alternate-device data transmission unit transmits the data to be processed to the alternate peripheral device. The alternate-device data transmission notification unit notifies the terminal that the alternate-device data transmission unit has transmitted the data to be processed to the alternate peripheral device.

5 Claims, 11 Drawing Sheets

PERIPHERAL DEVICE, RECORDING MEDIUM, AND DATA PROCESSING METHOD

INCORPORATION BY REFERENCE

The disclosure of Japanese Patent Application No. 2013-248549 filed on Nov. 29, 2013 including the specification, drawings and abstract is incorporated herein by reference in its entirety.

BACKGROUND

This disclosure relates to a peripheral device, a recording medium, and a data processing method.

Typical existing peripheral devices include image forming devices, such as multifunctional peripherals (MFP), capable of printing text and graphical images.

Some of the typical image forming devices switch their status between an operating mode and a power saving mode. The typical image forming devices can obtain print data and information about device modes and other types of information and can receive facsimile data through a network even in the power saving mode. Generally, when the image forming devices in a power saving mode obtain print data, the devices need to return to the operating mode with a rapid application of heat to a heater of a fixing unit to form an image. This may result in considerable power consumption.

The typical image forming devices are used with information processing devices. An information processing device, such as a personal computer (PC), is connected through an interface to a plurality of image forming devices and has a default printer memory that stores a default (preset) image forming device that is set to be firstly used before the other image forming devices. If the information processing device determines that an image forming device detected as being in the power saving mode is the image forming device stored in the default printer memory, the information processing device chooses an alternate image forming device.

SUMMARY

A peripheral device according to an embodiment of the present disclosure is connectable to a terminal via a network and includes an alternate-device search unit, an alternate-device data transmission unit, and an alternate-device data transmission notification unit. The alternate-device search unit searches for an alternate peripheral device in an operation mode near the peripheral device if the peripheral device is in the power saving mode when receiving data to be processed from the terminal. When the alternate-device search unit locates the alternate peripheral device in the operation mode, the alternate-device data transmission unit transmits the data to be processed to the alternate peripheral device. The alternate-device data transmission notification unit notifies the terminal that the alternate-device data transmission unit has transmitted the data to be processed to the alternate peripheral device.

DETAILED DESCRIPTION

Embodiment

[Entire Configuration of Image forming System X]

Figure 1:
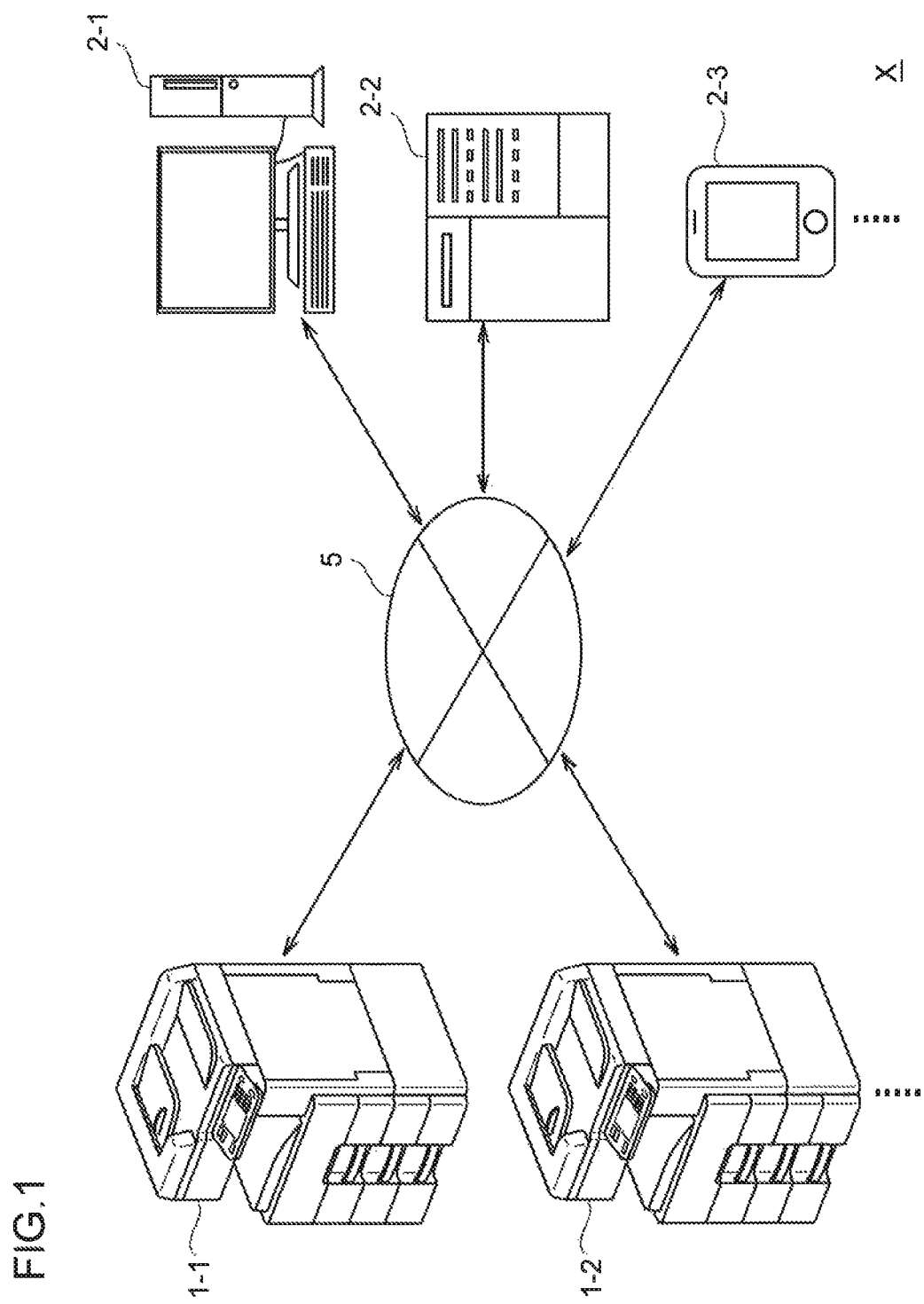
FIG. 1 illustrates the entire configuration of an image forming system according to an embodiment of the present disclosure.

Referring to FIG. 1, descriptions will be given about the entire configuration of an image forming system X according to an embodiment of the present disclosure.

The image forming system X includes image forming devices 1-1 to 1-$n$, as an example of peripheral devices, and terminals 2-1 to 2-$n$, and the image forming devices and terminals are connected to one another via a network 5.

Hereinafter, the term "image forming device 1" refers to any of the image forming devices 1-1 to 1-$n$, and the term "terminal 2" refers to any of the terminals 2-1 to 2-$n$. Among the image forming devices 1-1 to 1-$n$, a predominantly operational image forming device is referred to as a "initial device", and the other image forming devices are referred to as "alternate devices".

The image forming device 1 is an image forming device, such as a multifunctional peripheral (MFP). In this embodiment, the image forming system X includes a plurality of the image forming devices 1.

The terminal 2 includes a personal computer (PC), such as a PC/AT compatible computer, a smart phone, a cell phone, a tablet terminal, etc. The image forming system X also can include a plurality of the terminals 2.

The network 5 is a LAN, a wireless LAN, a WAN, a cellular network, or a PHS network.

(Entire Configuration of Image Forming Device 1)

Figure 2:
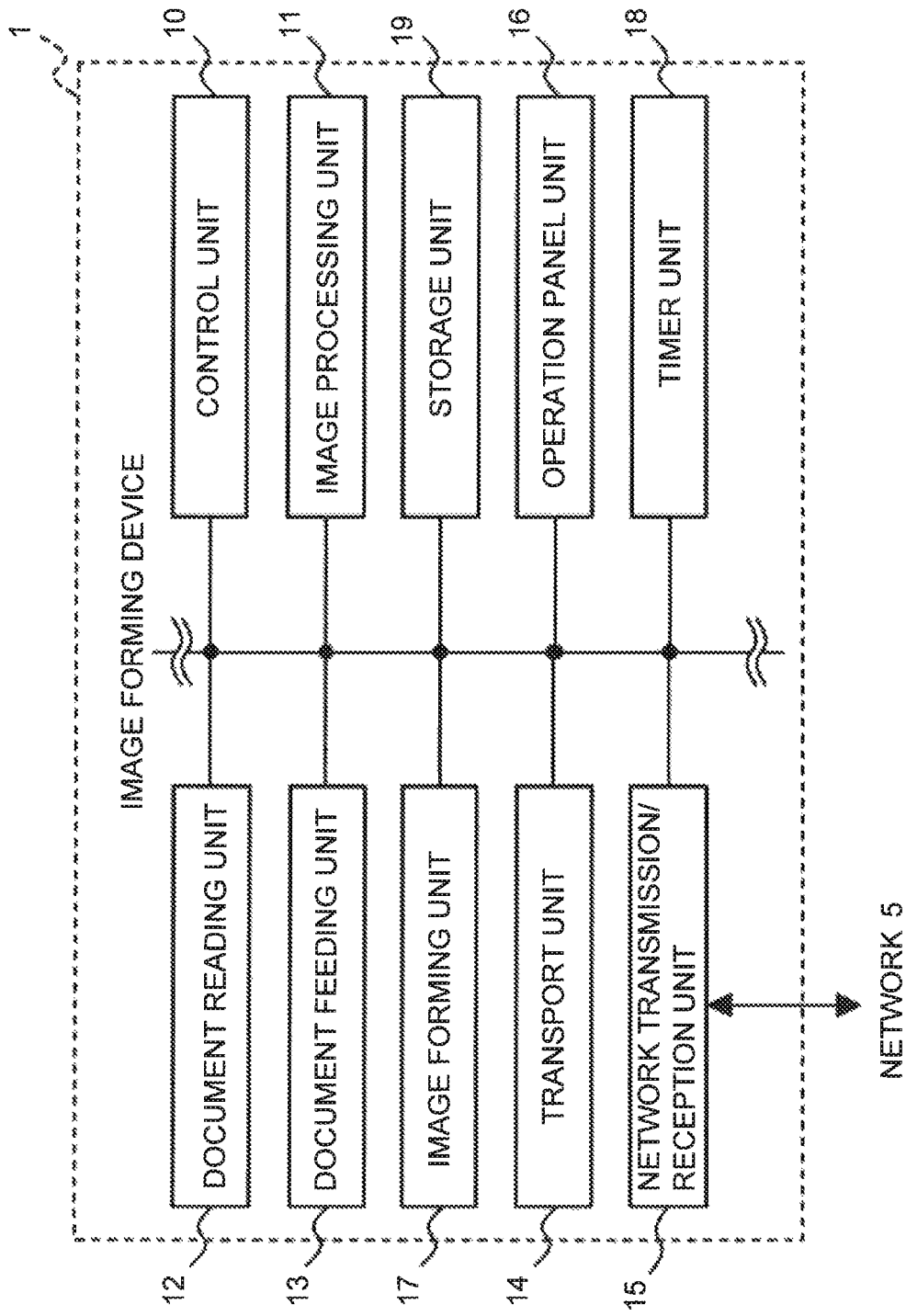
FIG. 2 illustrates the entire configuration of the image forming device shown in FIG. 1.

FIG. 2 shows that the image forming device 1 includes a control unit 10 connected to an image processing unit 11, a document reading unit 12, a document feeding unit 13, a transport unit 14, a network transmission/reception unit 15, an operation panel unit 16, an image forming unit 17, a timer unit 18, a storage unit 19 and some other units. The control unit 10 controls the operation of each unit.

The control unit 10 is an information processing unit, such as a general purpose processor (GPP), a central processing unit (CPU), a micro processing unit (MPU), a digital signal processor (DSP), a graphics processing unit (GPU), and an application-specific integrated circuit (ASIC).

The control unit 10 acts as various units in functional blocks, which will be described later, by reading a control program stored in a ROM or a HDD of the storage unit 19 and developing the control program in a RAM to execute it. In addition, the control unit 10 controls the whole device in response to instruction information input through external terminals or the operation panel unit 16.

The control unit 10 can read various types of information out from the storage unit 19 and perform control computations even in a power saving mode. In the power saving mode, the control unit 10 may operate with low power consumption by making the clock speed or the like, slower than in an operating mode.

The image processing unit 11 is a control computation unit, such as a digital signal processor (DSP) and a graphics processing unit (GPU). The image processing unit 11 performs image processing on image data, for example, scaling, intensity adjustment, tone adjustment, and image enhancement.

The image processing unit 11 stores an image read by the document reading unit 12 in the storage unit 19 as print data 300. The image processing unit 11 can also convert the print data 300 into a file unit formatted into PDF, TIFF or other format types before storing it in the storage unit 19.

The document reading unit 12 is a device to read (scan) a document set thereon.

The document feeding unit 13 is a device to transport the document to be read by the document reading unit 12.

The image forming unit 17 is a device to form an image on a sheet of recording paper from the data, which is stored in the storage unit 19, is read by the document reading unit 12, or is obtained from an external terminal in response to a user's output instruction. The image forming unit 17 does not need power during the power saving mode.

The transport unit 14 transports the sheet of recording paper and ejects the sheet with an image formed in the image forming unit 17.

The network transmission/reception unit 15 is a communication device including a LAN board, wireless transceiver, or other components used to connect to a LAN, a wireless LAN, a WAN, and an external network, such as a cellular network.

The network transmission/reception unit 15 transmits and receives data through a data communication line and voice signals through a voice telephone line in the operating mode and power saving mode.

The operation panel unit 16 is provided with a display device, such as an LCD, and an input device. The input device includes a numeric keypad, a start button, a cancellation button, mode switch buttons for changing operating modes among copying, FAX transmission, scanning and so on, buttons or a touch panel for providing instructions to execute jobs including printing, transmission, and storage of selected documents.

The operation panel unit 16 acquires various job instructions for the image forming device 1 from users. In addition, individual user's information can be input or changed by the user's instruction acquired through the operation panel unit 16.

The timer unit 18 is a time acquisition device, such as a real-time clock, a global positioning system (GPS) receiver, and a network time protocol (NTP) client.

The timer unit 18 can acquire real time information with fewer errors. If the timer unit 18 is provided with a GPS receiver, the timer unit 18 can acquire location information of the image forming device 1.

The timer unit 18 also functions as a timer, for example, the times to switch between the power saving mode and operating mode and the times of other events are programmable.

The storage unit 19 is a semiconductor memory device, such as a read only memory (ROM) and a random access memory (RAM), or a recording media device, such as a Hard Disk Drive (HDD).

The storage unit 19 can retain stored contents even in the power saving mode and is readable and rewritable.

The ROM or HDD of the storage unit 19 contains a control program to control the operation of the image forming device 1. In addition, the storage unit 19 stores user account settings. The storage unit 19 may have storage folder regions for respective users.

In the image forming device 1, the control unit 10 and image processing unit 11 can be formed into an integral unit like a CPU/GPU integration and a chip-on-module package.

The control unit 10 and image processing unit 11 can have a built-in RAM, a built-in ROM, a built-in flash memory or the like.

The image forming device 1 can also include a FAX transmission/reception unit to perform facsimile transmission and reception.

(Entire Configuration of Terminal 2)

Figure 3:
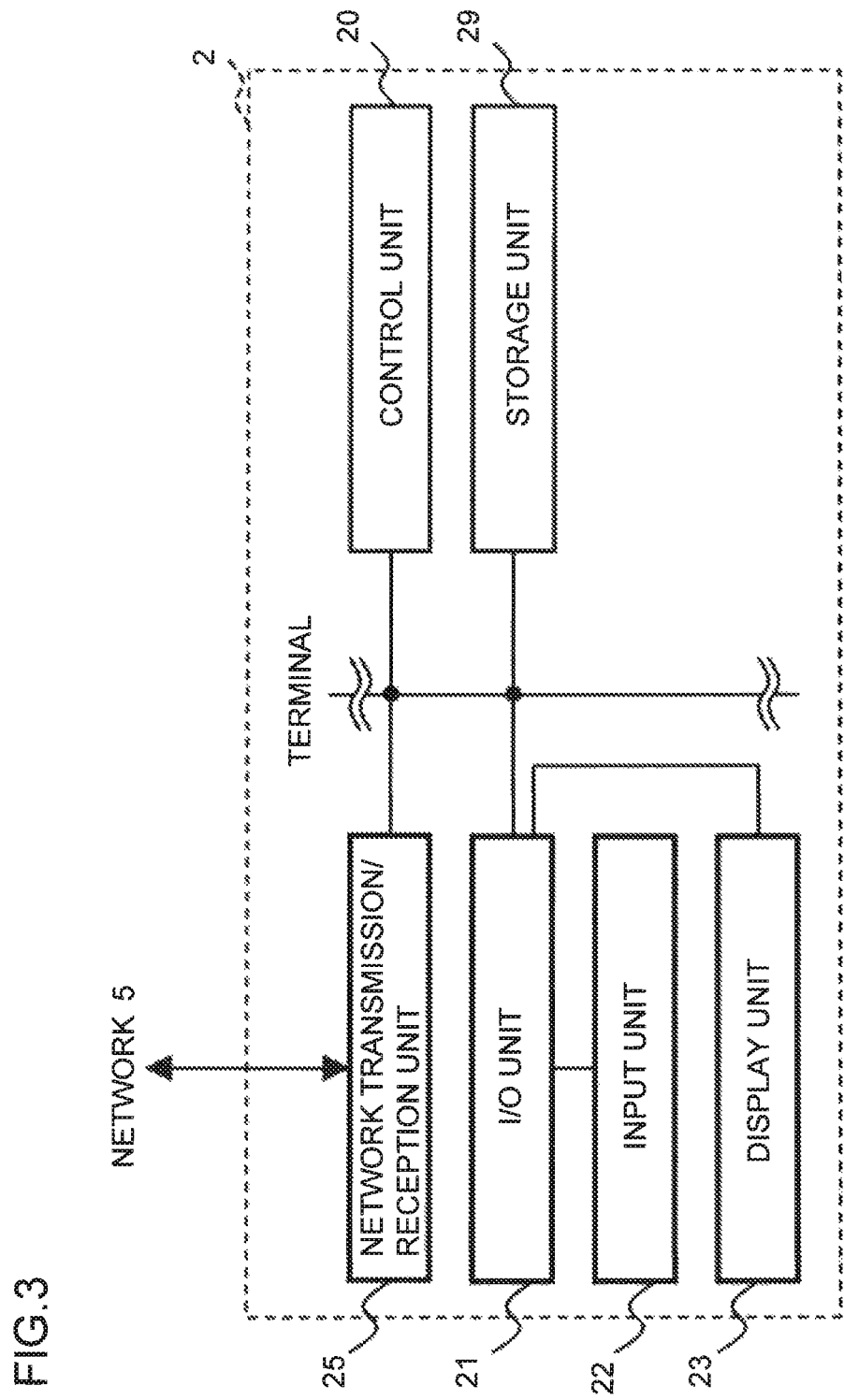
FIG. 3 illustrates the entire configuration of the terminal shown in FIG. 1.

FIG. 3 shows that the terminal 2 includes a control unit 20, an I/O unit 21, an input unit 22, a display unit 23, a network transmission/reception unit 25, and a storage unit 29. The control unit 20 controls the operation of each unit.

The control unit 20 is a control unit having computing/controlling capability, such as a central processing unit (CPU), a micro processing unit (MPU), a digital signal processor (DSP), a graphics processing unit (GPU), and an application-specific integrated circuit (ASIC). The control unit 20 executes various programs stored in the storage unit 29 with hardware resources.

The I/O unit 21 is a component providing an interface, such as a DVI, an analog RGB, an HDMI (trademark), a USB, an IEEE 1394, a serial interface, a parallel interface, an infrared interface, and a wireless interface, to connect to various peripheral devices. The I/O unit 21 is connected to the input unit 22 and display unit 23.

The input unit 22 is a device, such as a keyboard, a mouse, a touch panel, and a touch pad, used to input various types of setting information, user authentication information and so on.

The display unit 23 is a device, such as an LCD display and an organic electroluminescent display. The display unit 23 can display various setting screens of the operating system (OS), drawing screens of application software, and other types of screens.

The network transmission/reception unit 25 is, for example, a LAN interface or a wireless LAN interface compliant with 1000 BASE-T/100 BASE-TX, or a cell-phone radio wave transmission/reception device, to connect to the network 5. The terminal 2 can transmit and receive various types of data, user IDs and passwords required at the time of user login, and so on, through the network transmission/reception unit 25.

Alternatively, the network transmission/reception unit 25 can be connected to the network 5 through an external hub, an external router, or the like.

The storage unit 29 is a storage device including a main storage device such as a random access memory (RAM), a flash memory disk such as a solid state drive (SSD), and an auxiliary storage device such as a hard disk drive (HDD), a magnetic tape drive, and an optical disc drive. The storage unit 29 stores various programs and data to cause the terminal 2 to function as a document browsing terminal. Further details of the programs and data will be described later.

In addition, the storage unit 29 stores an operating system (OS) provided with a graphical user interface (GUI), application software, such as word processing software, spreadsheet software, drawing software, WWW browser, and electronic mailer, and other types of programs and data. The programs and data can be retrieved for execution and rewritten by the control unit 20.

[System Configuration of Image Forming System X]

Figure 4:
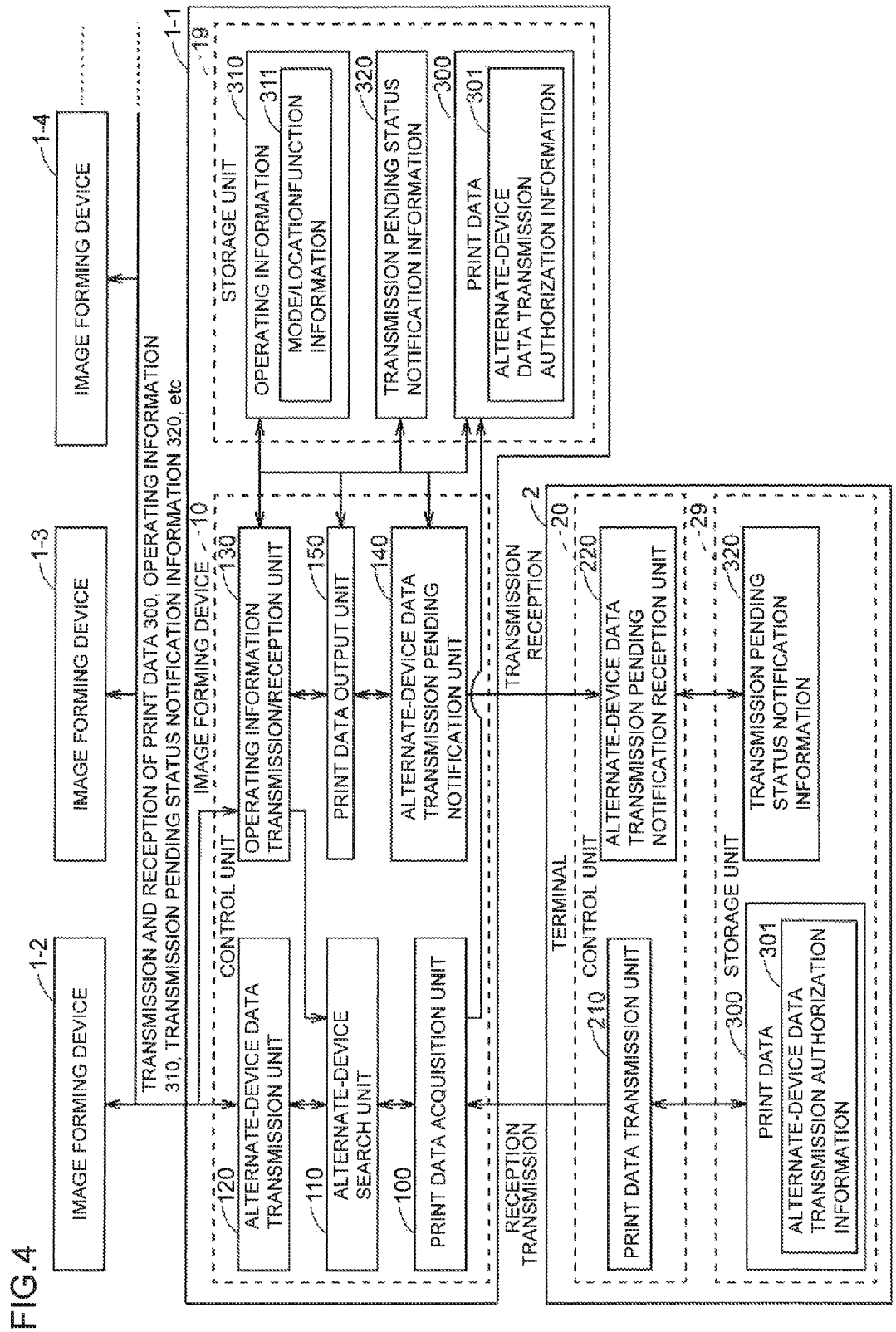
FIG. 4 illustrates the system configuration of the image forming system shown in FIG. 1.

Referring to FIG. 4, the system configuration of the image forming system X including the image forming devices 1 and a terminal 2 will be described.

Each of the image forming devices 1 includes a print data acquisition unit 100, an alternate-device search unit 110, an alternate-device data transmission unit 120, an operating information transmission/reception unit 130, an alternate-device data transmission pending notification unit 140 (alternate-device data transmission notification transmission unit, temporary pending notification transmission unit), and a print data output unit 150.

The storage unit 19 of the image forming devices 1 stores print data 300, operating information 310, and transmission pending status notification information 320. The storage unit 19 also functions as a temporary data storage unit for temporarily storing data to be processed.

The terminal 2 includes a print data transmission unit 210 and an alternate-device data transmission pending notification reception unit 220 (alternate-device data transmission notification reception unit, temporary pending notification reception unit).

The storage unit 29 of the terminals 2 stores print data 300 and transmission pending status notification information 320.

The print data acquisition unit 100 acquires print data 300 from the document reading unit 12, terminal 2, FAX transmission/reception unit, external recording medium, or the like and stores the print data 300 in the storage unit 19. The print data acquisition unit 100 can store the print data 300 in the storage unit 19 even in the power saving mode.

In addition, the print data acquisition unit 100 can change the settings of the storage unit 19 so as to hold the acquired print data 300 for a specific period of time. The specific period of time can be defined by an administrative user through the operation panel unit 16, for example, a few seconds to a few days.

If an image forming device 1 is in the power saving mode when it acquires print data 300 from a terminal 2, the alternate-device search unit 110 of the device searches other image forming devices for an alternate image forming device in an operating mode. The alternate-device search unit 110 can locate the alternate image forming device in the operating mode by referring to mode/location/function information 311 contained in the operating information 310 of its own device or the alternate device.

When the alternate-device search unit 110 locates the alternate image forming device in the operating mode, the alternate-device data transmission unit 120 transmits the print data 300 to the alternate image forming device.

Alternatively, when the alternate-device data transmission unit 120 receives a notification that an alternate image forming device has returned to the operating mode from the alternate image forming device within the specific period of time, the alternate-device data transmission unit 120 transmits the print data 300 temporarily stored in the temporary data storage unit to the alternate image forming device that has returned to the operating mode.

In addition, the alternate-device data transmission unit 120 refers to alternate-device data transmission authorization information 301 contained in the print data 300 and transmits the print data 300 only when transmission is authorized by the alternate-device data transmission authorization information 301.

When the alternate-device search unit 110 of an image forming device 1 delivers an inquiry to search other devices for an alternate device in an operating mode and an alternate device in the operating mode responds to the inquiry, the operating information transmission/reception unit 130 acquires operating mode information from the alternate device in the operating mode and stores the operating mode information in the storage unit 19.

When the operating information transmission/reception unit 130 detects that its own device has returned from the power saving mode to the operating mode, the unit 130 updates the operating mode information of its own device. When the operating information transmission/reception unit 130 receives an inquiry from an alternate device into whether its own device is in the power saving mode or operating mode, the operating information transmission/reception unit 130 receives alternate-device data transmission authorization information 301 contained in the print data 300 to compare it with the operating mode information of its own device. If the operating information transmission/reception unit 130 detects that its own device can output the print data 300, the unit 130 transmits the operating information 310 of its own device to the alternate device.

The alternate-device data transmission pending notification unit 140 writes that the alternate-device data transmission unit 120 has transmitted the print data 300 to the alternate device into transmission pending status notification information 320 and provides the notification to the terminal 2.

If the alternate-device search unit 110 did not locate an alternate device to which the print data 300 can be transmitted, the alternate-device data transmission pending notification unit 140 writes that the print data 300 has been stored in the storage unit 19 for a specified period of time into transmission pending status notification information 320 and provides the notification to the terminal 2.

If the print data output unit 150 detects that its own device in the operating mode has acquired print data 300 from an alternate device or terminal 2, the print data output unit 150 outputs the print data 300 from the image forming unit 17.

When the print data output unit 150 detects that its own device temporarily stores the print data 300 in the storage unit 19 and has received an output instruction of the print data 300 from a user, or when its own device has not returned to the operating mode within a specified period of time, the print data output unit 150 causes its own device to enter the operating mode to form an image from the temporarily stored print data 300 by the image forming unit 17 and deletes the print data 300.

The print data transmission unit 210 transmits text data or the like, which was generated by application software and is temporarily stored in the storage unit 29, to an image forming device 1 as print data 300.

The alternate-device data transmission pending notification reception unit 220 receives transmission pending status notification information 320 from the image forming device 1 to which the print data 300 has been transmitted and stores the information 320 in the storage unit 29.

The print data 300 is image data and/or text data that is acquired by the print data acquisition unit 100 and is planned to be processed. The image data and/or text data of the print data 300 may be image data in a bitmap format read by the document reading unit 12, page description language (PDL) document data acquired from the terminal 2 or external recording media, portable document format (PDF) document data, image data in a format of JPEG, GIF, TIFF, or other various types of data. In addition, the print data 300 may be a temporarily stored data on which PDL data or the like is rendered, compressed or processed in other ways. Furthermore, the print data 300 may contain data regarding the type, IP address, and user name of the device or unit in which the data was generated.

The print data 300 contains alternate-device data transmission authorization information 301.

The alternate-device data transmission authorization information 301 indicates whether transmission of data to an alternate device is permitted. The alternate-device data transmission authorization information 301 contains print permissible functional information regarding, for example, the allowable distance of the alternate device to which the initial device can transmit the print data 300 (i.e., a distance range defined as the neighborhood of the initial device) and whether the print data 300 needs to be printed in color, with a specific resolution, or on recording paper in a specific size, and needs postprocessing. The neighborhood distance from the initial device in the alternate-device data transmission authorization information 301 can be limited to the same network defined by IP addresses, or can be set based on location information by GPS or the like, installation location, level of floors where the devices are installed, identification name, group name, and other types of names.

The operating information 310 is information prepared to notify the mode, settings, and capability of the initial device or alternate devices. The operating information 310 is transmitted and received by the operating information transmission/reception unit 130.

The operating information 310 contains mode/location/function information 311.

The mode/location/function information 311 contains mode information, location information, and function information. The mode information indicates whether the initial device or alternate devices are in a power saving mode or operating mode. The location information indicates the IP address, installation location, the level of the floor, identification name, group name, and so on of the initial device or alternate devices. The function information indicates the functions of the initial device or alternate devices, for example, the print capability in color and black-and-white, the printable resolution, printable paper size, the necessity of post-processing, and so on.

The transmission pending status notification information 320 is used to notify of events and includes an alternate-device data transmission notification, a print pending notification, an output completion notification, and some other notifications. The alternate-device data transmission notification indicates that print data 300 has been transmitted to an alternate device. The print pending notification indicates that printing of the print data 300 has been put on hold and the print data 300 is in the storage unit 19. The output completion notification indicates that an alternate device or initial device has completed output or printing.

The transmission pending status notification information 320 may contain the IP address, identification name, or other information of the alternate device to which the print data 300 has been transmitted or output.

The control unit 10 of the image forming devices 1 executes a control program stored in the storage unit 19 to function as the print data acquisition unit 100, alternate-device search unit 110, alternate-device data transmission unit 120, operating information transmission/reception unit 130, alternate-device data transmission pending notification unit 140, and print data output unit 150. The control unit 20 of the terminal 2 executes a control program stored in the storage unit 29 to function as the print data transmission unit 210 and alternate-device data transmission pending notification reception unit 220.

The respective components of the image forming device 1 and terminal 2 are hardware resources that implement the image forming method according to the present disclosure.

[Alternate-Device Data Transmission or Pending processing and Alternate-Device Data Reception/Print Processing by Image Forming Device 1]

Referring to FIGS. 5 to 8, descriptions will be made about alternate-device data transmission or pending processing and alternate-device data reception/print processing by an image forming devices 1 according to the embodiment of the present disclosure.

In the alternate-device data transmission or pending processing according to the embodiment, when an image forming device 1 in a power saving mode (image forming device 1-1 in the following example) receives an output request of print data 300 and there is an image forming device 1 (image forming device 1-2 in the following example) in an operating mode in the neighborhood of the image forming device 1-1, the print data 300 is output from the image forming device 1-2 in the operating mode. If the image forming device 1-1 determines that both the device itself and the other alternate devices are not in the operating mode, the image forming device 1-1 temporarily stores the print data 300 in the storage unit 19.

In the alternate-device data reception/print processing according to the embodiment, the image forming device 1 in the operating mode (image forming device 1-2 in the following example) acquires the print data 300 from the image forming device 1 in the power saving mode (image forming device 1-1 in the following example) and outputs the print data 300.

In the alternate-device data transmission or pending processing and alternate-device data reception/print processing by the image forming devices 1 according to the embodiment, the control unit 10 of the image forming device 1-1 or image forming device 1-2 executes the program stored in the storage unit 19 in cooperation with the respective components as hardware resources.

Referring to the flow chart in FIG. 5, the alternate-device data transmission or pending processing by the image forming device 1-1 will be described in detail step by step.

(Step S101)
First, the control unit 10 performs print data acquisition processing as a print data acquisition unit 100.

The control unit 10 acquires print data 300 transmitted from the terminal 2 and stores it in the storage unit 19. In the example shown in FIGS. 7 and 8, the image forming device 1-1 acquires print data 300 transmitted from a terminal 2-1.

(Step S102)
Then, the control unit 10 of the image forming device 1-1 determines, as an alternate-device search unit 110, whether the image forming device 1-1 is in the operating mode. In a case where the image forming device 1-1 is in the operating mode, the control unit 10 provides a Yes answer. The control unit 10 provides a No answer in the other cases.

If Yes, the control unit 10 goes to step S105.
If No, the control unit 10 goes to step S103.

(Step S103)
If the control unit 10 determines that the image forming device 1-1 is not in the operating mode, the control unit 10 determines as an alternate-device search unit 110 whether transmission of data to an alternate device is permitted. In a case where alternate-device data transmission authorization information 301 in the print data 300 indicates that the print data 300 is permitted to be transmitted to the alternate device (hereinafter, referred to as "alternate-device data transmission"), the control unit 10 provides a Yes answer. The control unit 10 provides a No answer in the other cases.

If Yes, the control unit 10 goes to step S106.
If No, the control unit 10 goes to step S104.
(Step S104)

If the alternate-device data transmission is not permitted, the control unit 10 performs activation processing from the power saving mode as a print data output unit 150.

The control unit 10 supplies electric power to the image forming unit 17 to enter an operating mode where images can be formed on recording paper.
(Step S105)

At step S105, the control unit 10 performs image formation processing as a print data output unit 150.

The control unit 10 retrieves the print data 300 from the storage unit 19 and causes the image forming unit 17 to form an image of the print data 300 on recording paper to output it.

Subsequently, the control unit 10 terminates the alternate-device data transmission or pending processing.
(Step S106)

If the alternate-device data transmission is permitted, the control unit 10 performs operating alternate-device search processing as an alternate-device search unit 110.

The control unit 10 delivers an inquiry through broadcasting or other methods to locate an alternate device in operation. The control unit 10 can transmit the alternate-device data transmission authorization information 301 of the print data 300 with the inquiry.

Upon receiving the inquiry, an alternate device in operation responds by transmitting its operating information 310.

Figure 7:
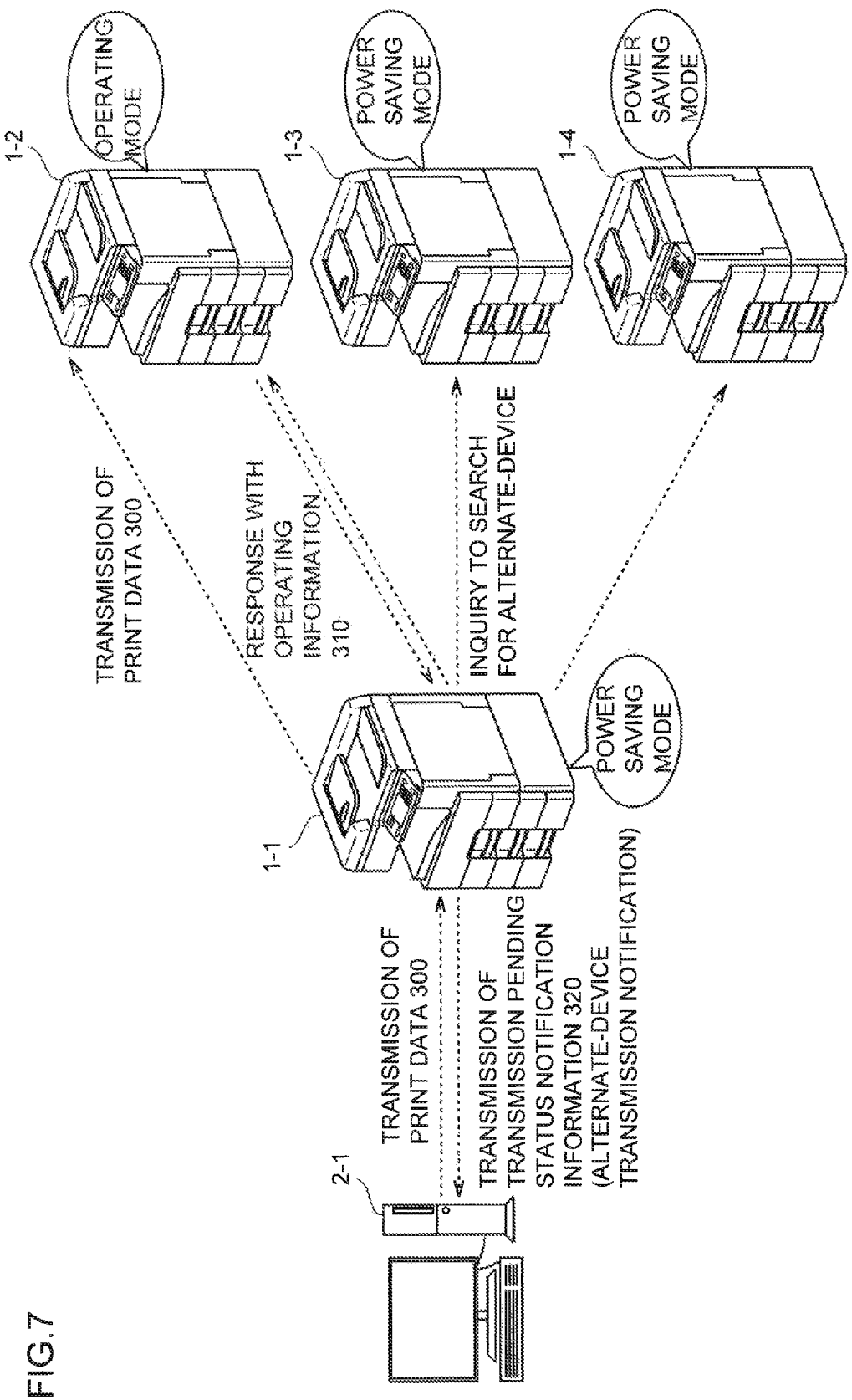
FIG. 7 is a conceptual diagram of the alternate-device data transmission processing shown in FIG. 5.

In the example shown in FIG. 7, the image forming device 1-1 delivers an inquiry to an image forming device 1-2 (in the operating mode), an image forming device 1-3 (in the power saving mode), and an image forming device 1-4 (in the power saving mode). In response to the inquiry, the image forming device 1-2 in the operating mode responds by transmitting the operating information 310. In this case, the mode information of the mode/location/function information 311 contained in the operating information 310 indicates that the image forming device 1-2 is in operation.

Figure 8:
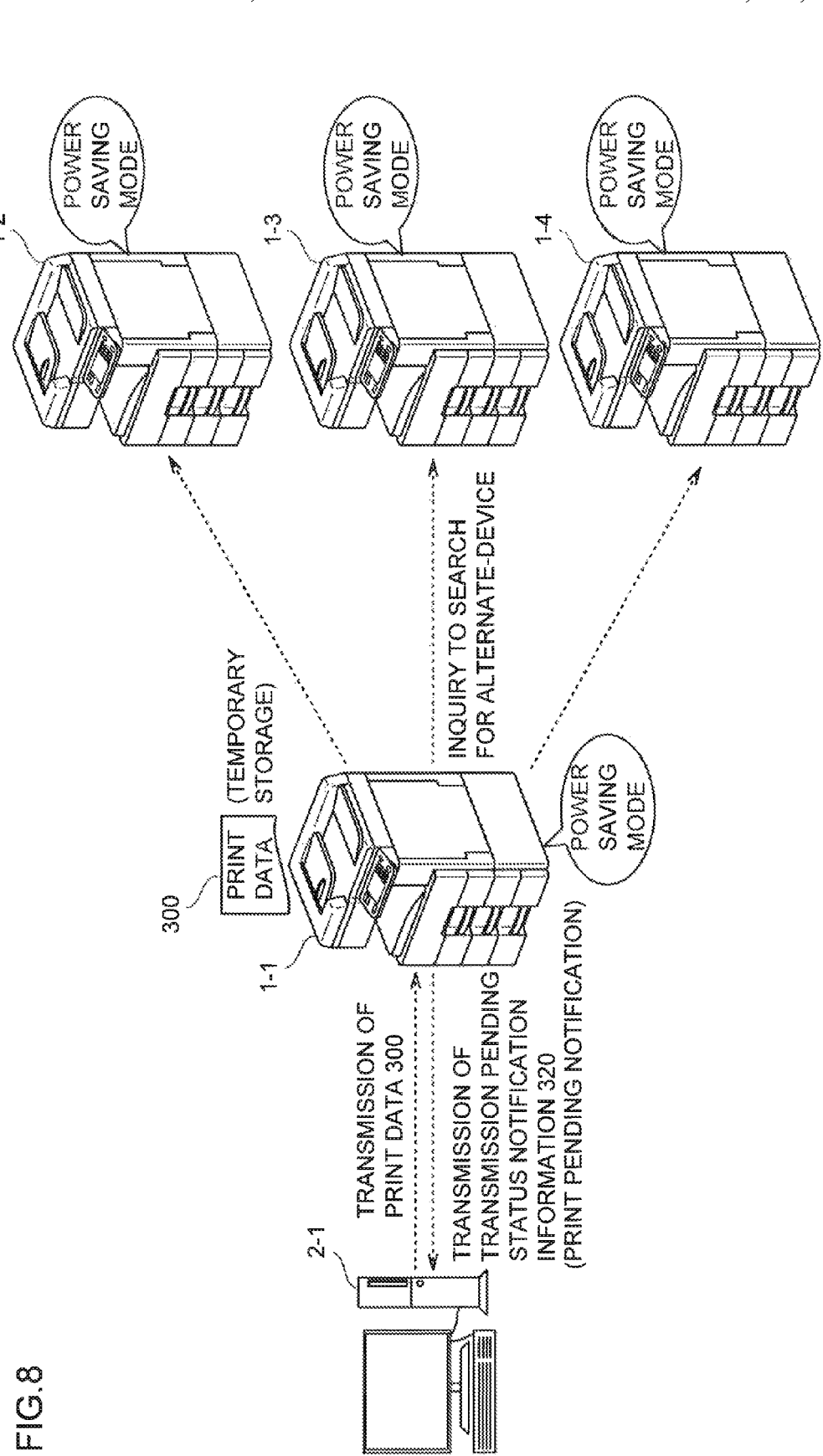
FIG. 8 is a conceptual diagram of the print pending notification processing shown in FIG. 5.

In the example shown in FIG. 8, the image forming device 1-1 delivers an inquiry to an image forming device 1-2 (in the power saving mode), an image forming device 1-3 (in the power saving mode), and an image forming device 1-4 (in the power saving mode). None of the image forming devices 1-2, 1-3, 1-4 respond to the inquiry.

Alternatively, the image forming devices can keep running their functions relating to network communications even during power saving mode, thereby making it possible to respond to the inquiry. In this case, the alternate devices that have received the inquiry can transmit their operating information 310 even they are in the power saving mode, and the mode/location/function information 311 contained in the operating information 310 indicates the power saving mode.
(Step S107)

Next, the control unit 10 determines, as an alternate-device search unit 110, whether the control unit 10 has received the operating information 310. In a case where the control unit 10 has received the operating information 310 from an alternate device in operation, the control unit 10 provides a Yes answer. The control unit 10 provides a No answer in the other cases.

In the example shown in FIG. 7, when the image forming device 1-1 has received operating information 310 from the image forming device 1-2, the control unit 10 provides a Yes answer. In the example shown in FIG. 8, the control unit 10 provides a No answer because the image forming device 1-1 does receive the operating information 310.

If Yes, the control unit 10 goes to step S108.
If No, the control unit 10 goes to step S112.
(Step S108)

When receiving the operating information 310 from the alternate device in operation, the control unit 10 performs operating-information interpretation processing as an alternate-device data transmission unit 120.

The control unit 10 reads out the mode/location/function information 311 contained in the received operating information 310 and interprets it by parsing or other methods.
(Step S109)

Next, the control unit 10 determines, as an alternate-device data transmission unit 120, whether the alternate device has the capabilities to print out the print data 300. Specifically, the control unit 10 determines whether the interpreted mode/location/function information 311 satisfies print conditions described in the alternate-device data transmission authorization information 301 of the print data 300. More specifically, the control unit 10 compares, for example, the distances obtained from the location information of its own device and the location information of the alternate device contained in the mode/location/function information 311 with the distance range in the neighborhood of its own device defined in the alternate-device data transmission authorization information 301, to locate the alternate device in the neighborhood of its own device. Furthermore, the control unit 10 determines whether the alternate device in the neighborhood of its own device is in operation based on the mode information of the alternate device contained in the mode/location/function information 311. If the control unit 10 determines that the alternate device in the neighborhood of its own device is in operation, the control unit 10 compares the function information of the alternate device contained in the mode/location/function information 311 with print permissible functional information contained in the alternate-device data transmission authorization information 301 to determine whether the alternate device in the neighborhood of its own device has the capability to print the print data 300. In a case where the interpreted mode/location/function information 311 satisfies the print conditions described in the alternate-device data transmission authorization information 301 of the print data 300 and the alternate device has the capabilities to print the print data 300, the control unit 10 provides a Yes answer. The control unit 10 provides a No answer in the other cases.

If only the alternate devices in operation are preset to transmit their operating information 310 to the device of the control unit 10, the processing of determining whether the alternate devices are in operation can be omitted.

If Yes, the control unit 10 goes to step S110.
If No, the control unit 10 goes to step S112.
(Step S110)

If the print data 300 is allowed to be transmitted to the alternate device, the control unit 10 performs alternate-device data transmission processing as an alternate-device data transmission unit 120.

The control unit 10 transmits the print data 300 stored in the storage unit 19 to the alternate device, which is determined as being capable of printing in step S109, and causes the alternate device to output the print data 300. After transmission of the print data 300, the control unit 10 can delete the print data 300 from the storage unit 19 of its own device. In the example of FIG. 7, the image forming device 1-1 transmits the print data 300 to the image forming device 1-2 that in turn outputs the print data 300.

(Step S111)

Next, the control unit 10 performs alternate-device data transmission notification processing as an alternate-device data transmission pending notification unit 140.

The control unit 10 writes information about the alternate-device data transmission notification in the transmission pending status notification information 320 and transmits it to the terminal 2. In the examples shown in FIGS. 7 and 8, the image forming device 1-1 transmits the transmission pending status notification information 320 to the terminal 2-1.

If the control unit 10 acquires transmission pending status notification information 320 with output completion notification written therein from the image forming device 1-2, the control unit 10 can transmit the information 320 to the terminal 2.

Subsequently, the control unit 10 terminates the alternate-device data transmission or pending processing according to the embodiment of this disclosure.

(Step S112)

If the control unit 10 cannot receive the operating information 310 from the alternate device in operation or the control unit 10 has received the operating information 310 from the alternate device in operation, but the alternate device does not have required print capabilities, the control unit 10 performs print data storing processing as a print data acquisition unit 100.

The control unit 10 sets the storage unit 19 to store the print data 300 for a specified period of time. When storing the data, the control unit 10 can compress or convert the print data 300 into a suitable storage form.

In the example shown in FIG. 8, the image forming device 1-1 temporarily stores the print data 300.

(Step S113)

Next, the control unit 10 performs print pending notification processing as an alternate-device data transmission pending notification unit 140.

The control unit 10 writes information about print pending notification in transmission pending status notification information 320 and transmits the information 320 to the terminal 2.

In the example shown in FIG. 8, the image forming device 1-1 makes a print pending notification.

Through the above described steps, the alternate device data transmission or pending processing according to the embodiment of the disclosure is completed.

Figure 6:
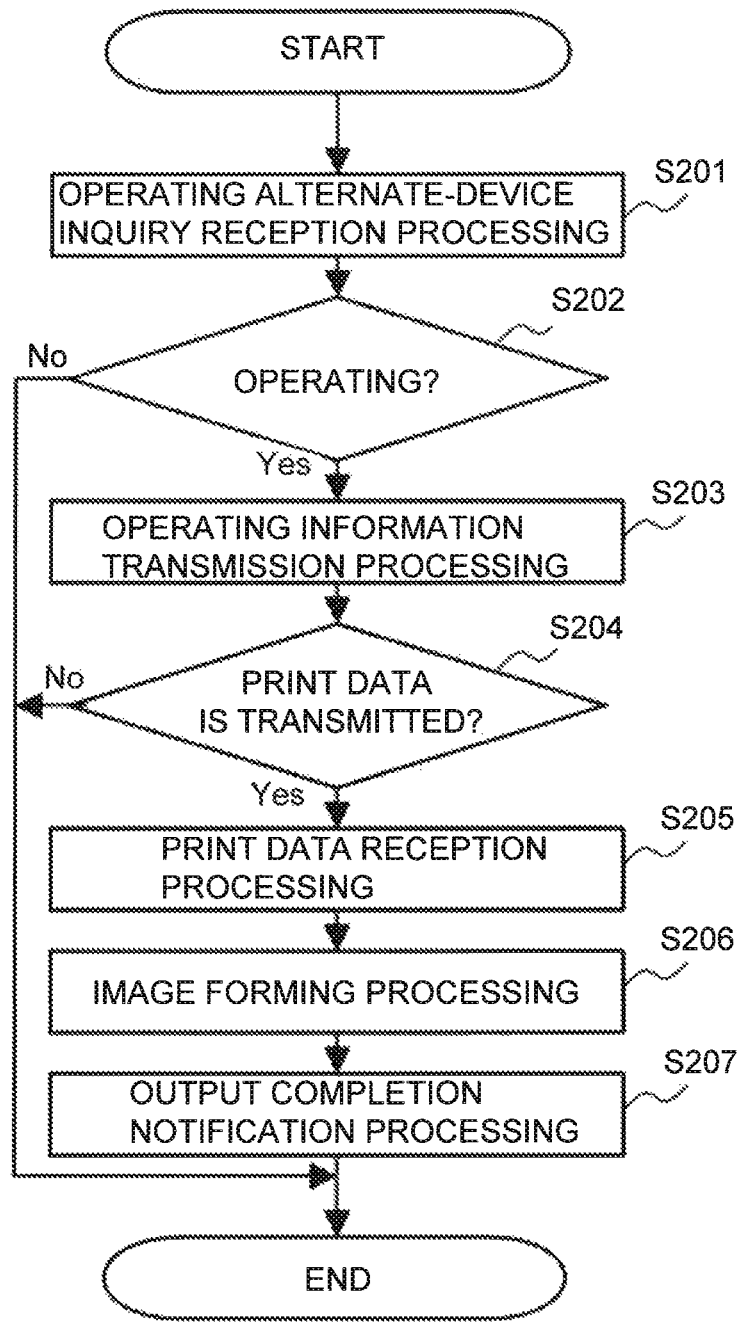
FIG. 6 illustrates a process of alternate-device data reception/print processing according to the embodiment of the disclosure.

Next, referring to the flow chart in FIG. 6, details of alternate-device data reception/print processing by the image forming device 1-2 will be described step by step.

(Step S201)

First, the control unit 10 of the image forming device 1-2 performs operating alternate-device inquiry reception processing as an operating information transmission/reception unit 130.

Figure 5:
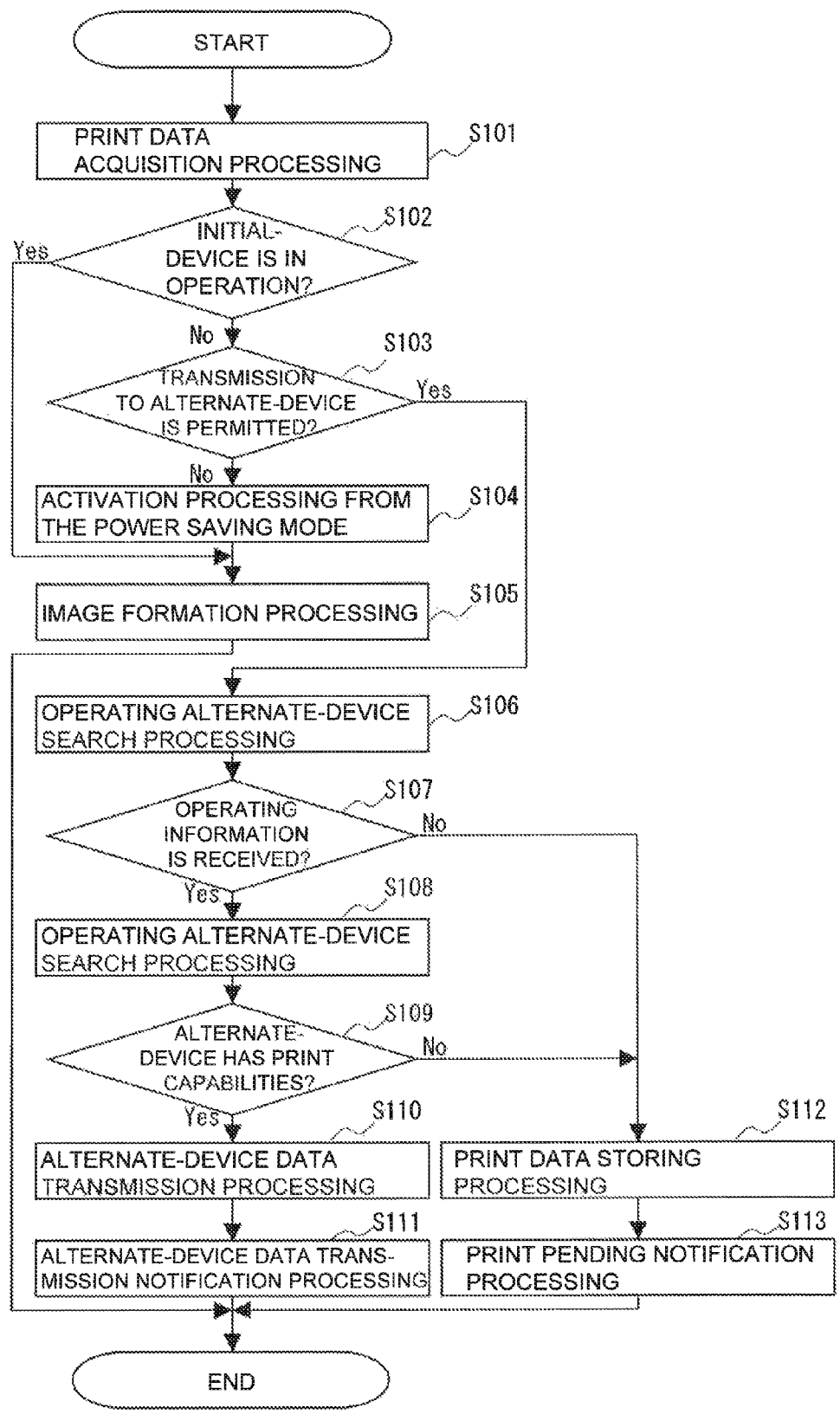
FIG. 5 illustrates a process of alternate-device data transmission processing or pending processing according to the embodiment of the disclosure.

The control unit 10 receives an inquiry transmitted to search for an operating alternate device in step S106 of FIG. 5 by broadcasting or other methods.

(Step S202)

Then, the control unit 10 determines, as an operating information transmission/reception unit 130, whether its own device is in the operating mode.

If Yes, that is, the device is in operation, the control unit 10 goes to step S203.

If No, that is, the device is in the power saving mode, the control unit 10 terminates the alternate-device reception/print processing.

(Step S203)

If the control unit 10 determines that its own device is in operation, the control unit 10 performs operating information transmission processing as an operating information transmission/reception unit 130.

The control unit 10 responds to the search inquiry by transmitting its operating information 310.

(Step S204)

Then, the control unit 10 determines, as an operating information transmission/reception unit 130, whether the print data 300 has been transmitted from the device that has transmitted the inquiry. In a case where the print data 300 has been transmitted from the image forming device 1-1 through the alternate device data transmission processing in step S110 of FIG. 5, the control unit 10 of the image forming device 1-2 provides a Yes answer. The control unit 10 provides a No answer in the other cases.

If Yes, the control unit 10 goes to step S205.

If No, the control unit 10 terminates the alternate-device reception/print process.

(Step S205)

If the print data 300 has been transmitted from the device that has transmitted the inquiry, the control unit 10 performs print data reception processing as a print data acquisition unit 100.

The control unit 10 acquires the print data 300 transmitted from the device that has transmitted the inquiry and stores it in the storage unit 19.

In the example shown in FIG. 7, the image forming device 1-2 acquires print data 300 transmitted from the image forming device 1-1.

(Step S206)

Next, the control unit 10 performs image forming processing as a print data output unit 150.

The control unit 10 retrieves the print data 300 stored once in the storage unit 19 and causes the image forming unit 17 to form an image of the print data 300 on recording paper. The control unit 10 can delete the print data 300 from the storage unit 19 subsequent to the image formation.

(Step S207)

Next, the control unit 10 performs output completion notification processing as an alternate-device data transmission pending notification unit 140.

The control unit 10 writes information regarding output completion notification in transmission pending status notification information 320 and transmits the information 320 to the terminal 2.

Alternatively, the control unit 10 can transmit the output completion notification to the image forming device 1-1. In this case, the control unit 10 of the image forming device 1-1 further transmits the output completion notification to the terminal 2 as an alternate-device data transmission pending notification unit 140.

Through the above-described steps, the alternate-device reception/print processing according to the embodiment of the disclosure is completed.

[Activated-Alternate-Device Data Transmission/Output Processing and Alternate-Device Activation/Print Processing by Image Forming Device 1]

Next, referring to FIGS. 9 to 11, descriptions will be made about activated-alternate-device data transmission/output processing and alternate-device activation/print processing by the image forming device 1 according to the embodiment of the disclosure.

In the activated-alternate-device data transmission/output processing of the embodiment, an image forming device 1 (image forming device 1-1 in the following example) with temporarily stored print data 300 in the storage unit 19 (step S112 in FIG. 5) waits for an alternate device to return to the operating mode while the image forming device 1 stays in the power saving mode.

The image forming device 1-1 acquires operating information 310 from the alternate device (image forming device 1-2 in the following example) that has returned from the power saving mode, and if the image forming device 1-2 has required print capabilities, the image forming device 1-1 causes the image forming device 1-2 to output the print data 300. If the image forming device 1-1 receives an instruction from a user or a specific period of time has elapsed, the image forming device 1-1 brings itself into the operating mode and outputs the temporarily stored print data 300.

In the alternate-device activation/print processing of the embodiment, an image forming device 1 (image forming device 1-2 in the following example) that has returned from the power saving mode to the operating mode acquires print data 300 from the image forming device 1-1 and outputs it.

The activated-alternate-device data transmission/output processing and alternate-device activation/print processing according to the embodiment are executed by the control unit 10 with a program stored in the storage unit 19 in cooperation with the respective components as hardware resources.

Referring to the flow chart in FIG. 9, the details of the activated-alternate-device data transmission/output process will be given step by step.

(Step S121)

First, the control unit 10 of the image forming device 1-1 determines, as an alternate-device data transmission unit 120, whether its own device has print data 300 temporarily stored therein. In a case where the storage unit 19 of the image forming device 1-1 contains the print data 300 that is acquired from the terminal 2 and temporarily stored, the control unit 10 provides a Yes answer. The control unit 10 provides a No answer in the other cases.

If Yes, the control unit 10 goes to step S122.

If No, the control unit 10 terminates the activated-alternate-device data transmission/output processing.

(Step S122)

If the control unit 10 determines that its own device has the temporarily stored print data 300, the control unit 10 performs activated-alternate-device wait processing as an alternate-device data transmission unit 120.

The control unit 10 waits for an activated signal transmitted by broadcasting from an alternate device that is in the neighborhood of its own device and has returned from the power saving mode to the operating mode.

(Step S123)

Next, the control unit 10 determines, as an alternate-device data transmission unit 120, whether the control unit 10 has received the activated signal from the alternate device returned to the operating mode. In a case where the control unit 10 has received the activated signal from the alternate device, the control unit 10 provides a Yes answer. The control unit 10 provides a No answer in the other cases.

If Yes, the control unit 10 goes to step S124.

If No, the control unit 10 goes to step S128.

(Step S124)

If the control unit 10 receives the activated signal, the control unit 10 performs operating-information acquisition/interpretation processing as an alternate-device data transmission unit 120.

The control unit 10 makes a request for transmission of operating information 310 to the alternate device that has sent the activated signal and acquires the information 310. The control unit 10 interprets the mode/location/function information 311 of the acquired operating information 310. The processing in step S124 is performed in the same manner as that in step S108 of FIG. 5.

(Step S125)

Next, the control unit 10 determines, as an alternate-device data transmission unit 120, whether the alternate device that has sent the operating information 310 has the capabilities to print out the print data 300. The control unit 10 determines, in the same manner as that in step S109 of FIG. 5, whether the interpreted mode/location/function information 311 satisfies the print conditions described in the alternate-device data transmission authorization information 301 of the print data 300 temporarily stored in the storage unit 19 of its own device. In a case where the interpreted mode/location/function information 311 satisfies the print conditions described in the alternate-device data transmission authorization information 301 of the print data 300 temporarily stored in the storage unit 19 of its own device and the alternate device has the capabilities to print the print data 300, the control unit 10 provides a Yes answer. The control unit 10 provides a No answer in the other cases.

If Yes, the control unit 10 goes to step S126.

If No, the control unit 10 terminates the activated-alternate-device data transmission/output processing.

(Step S126)

If the alternate device has the capability to print out the print data 300, the control unit 10 performs alternate-device data transmission processing as an alternate-device data transmission unit 120.

The control unit 10 transmits the print data 300 to the alternate device that has sent the operating information 310. The processing in step S126 is performed in the same manner as that in step S110 of FIG. 5.

Figure 11:
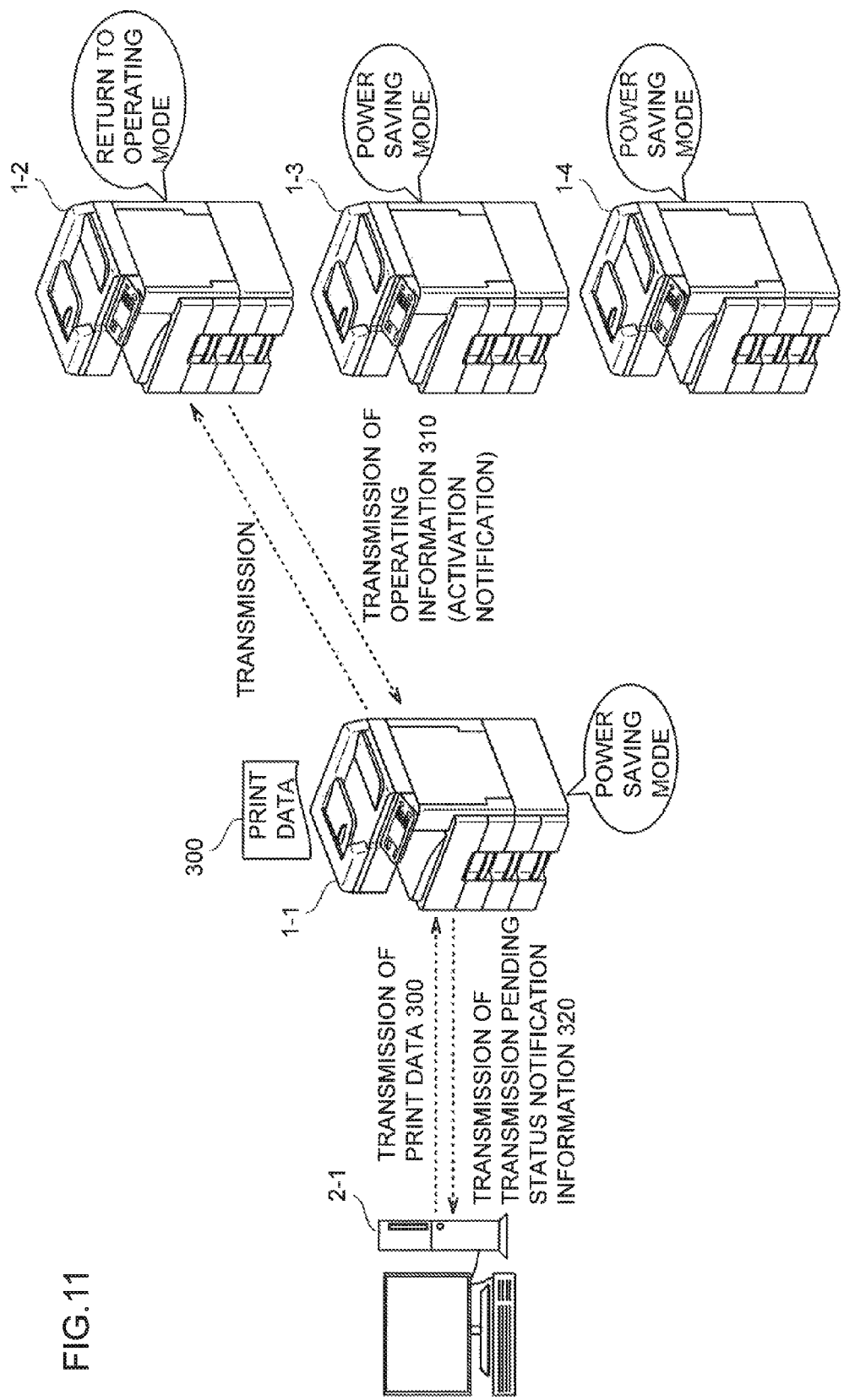
FIG. 11 is a conceptual diagram of the alternate-device data transmission notification processing shown in FIG. 9.

In the example shown in FIG. 11, the image forming device 1-1 that temporarily stores the print data 300 transmits the print data 300 to the image forming device 1-2 that has returned to the operating mode.

(Step S127)

Next, the control unit 10 performs alternate-device data transmission notification processing as an alternate-device data transmission pending notification unit 140. The processing in step S127 is also performed in the same manner as that in step S111 of FIG. 5.

Subsequently, the control unit 10 terminates the activated-alternate-device data transmission/output processing.

(Step S128)

If the alternate device does not have the capabilities to print out the print data 300, the control unit 10 determines, as a print data output unit 150, whether a print instruction has been issued or a specific period of time has elapsed. In a case where a user has input a print instruction through the operation panel unit 16 or terminal 2 or a specific period of time has elapsed since the print data 300 was stored, the control unit 10 provides a Yes answer. The control unit 10 provides a No answer in the other cases.

If Yes, the control unit 10 goes to step S129.

If No, the control unit 10 terminates the activated-alternate-device data transmission/output processing.

(Step S129)

If a print instruction has been issued or a specific period of time has elapsed, the control unit 10 performs image forming processing as a print data output unit 150.

The processing in step S129 is performed in the same manner as that in step S105 of FIG. 5.

(Step S130)

Next, the control unit 10 performs temporarily-stored print data deletion processing as a print data output unit 150.

The control unit 10 deletes the print data 300 temporarily stored in the storage unit 19.

(Step S131)

Next, the control unit 10 performs output completion notification processing as an alternate-device data transmission pending notification unit 140.

The control unit 10 writes information about an output completion notification in transmission pending status notification information 320 and transmits the information 320 to the terminal 2.

Through the above-described steps, the activated-alternate-device data transmission/output processing according to the embodiment of the disclosure is completed.

Next, referring to the flow chart in FIG. 10, the details of the alternate-device activation/print processing by the image forming device 1-2 will be described step by step.

(Step S220)

First, the control unit 10 of the image forming device 1-2 performs operating-mode transition detection processing as an operating information transmission/reception unit 130.

The image forming device 1-2 in the power saving mode returns to the operating mode when a time preset by the timer unit 18 has come, when a button on the operation panel unit 16 or a sub power switch is depressed, when a motion sensor detects motion, when another print data 300 is acquired, or on other occasions.

The control unit 10 detects that the image forming device 1-2 has returned to the operating mode after the transition processing.

(Step S221)

The control unit 10 determines, as an operating information transmission/reception unit 130, whether the image forming device 1-2 has returned to the operating mode. In a case where the control unit 10 detects that the image forming device 1-2 has returned to the operating mode, the control unit 10 provides a Yes answer. The control unit 10 provides a No answer in the other cases.

If Yes, the control unit 10 goes to step S222.

If No, the control unit 10 terminates the alternate-device activation/print processing.

(Step S222)

If the image forming device 1-2 has returned to the operating mode, the control unit 10 performs activated-signal/operating-information transmission/reception processing as the operating information transmission/reception unit 130.

The control unit 10 transmits an activated signal by broadcasting or other methods.

If the control unit 10 receives a response to the broadcast or the like, the control unit 10 transmits operating information 310 to the device that transmitted the response.

In the example shown in FIG. 11, the image forming device 1-2, which has returned from the power saving mode to the operating mode, transmits its operating information 310 to the image forming device 1-1 temporarily storing the print data 300.

(Step S223)

Then, the control unit 10 determines, as an operating information transmission/reception unit 130, whether the print data 300 has been transmitted from the device to which the control unit 10 has transmitted the operating information 310. In a case where the print data 300 has been transmitted from the image forming device 1-1 through the alternate-device data transmission processing performed in step S126 of FIG. 9, the control unit 10 provides a Yes answer. The control unit 10 provides a No answer in the other cases.

If Yes, the control unit 10 goes to step S224.

If No, the control unit 10 terminates the alternate-device activation/print processing.

(Step S224 to Step S226)

Then, the control unit 10 of the image forming device 1-2 acquires the print data 300 from the image forming device 1-1 and outputs the print data 300. The processing in step S224, step S225, and step S226 are performed in the same manner as that in step S205, step S206, and step S207, respectively, in FIG. 6.

Through the above-described steps, the alternate-device activation/print processing according to the embodiment of the disclosure is completed.

The above-described configurations can provide the following effectiveness.

Some conventional technologies in this field require users to make registration of alternate image forming devices into a PC or the like, which takes time and labor.

On the contrary, the image forming device 1 according to the embodiment of the present disclosure can be connected to the terminal 2 through the network 5 and includes an alternate-device search unit 110 that searches for an alternate image forming device in the operating mode when the image forming device 1 is in the power saving mode upon receipt of print data 300 from the terminal 2, an alternate-device data transmission unit 120 that transmits the print data 300 to the alternate image forming device in the operating mode found by the alternate-device search unit 110, and an alternate-device data transmission pending notification unit 140 that notifies the terminal 2 that the alternate-device data transmission unit 120 has transmitted the print data 300 to the alternate device.

This configuration eliminates the necessity for users to register a plurality of image forming devices 1 into the terminal 2 to print out data from other image forming devices, thereby saving a user's time and labor and reducing the setting cost and some other expenses. Even when the layout of the image forming devices 1 is changed or additional image forming devices 1 are installed, there is no need to additionally register the image forming devices 1 one by one into the terminal 2 as new output devices, thereby saving a user's time and labor.

Since the alternate device to which the print data 300 is to be transmitted is in the operating mode, it is not necessary to bring the alternate device into the operating mode, thereby achieving low power consumption with reliability.

The image forming device 1 according to the embodiment of the present disclosure also includes a storage unit 19 that stores the print data 300 for a specific period of time when the alternate-device search unit 110 cannot find an alternate image forming device in the operating mode. In addition, when the image forming device 1 receives a notification that an alternate image forming device has returned to the operating mode within the specified period of time, the alternate-device data transmission unit 120 transmits the print data 300 stored in the storage unit 19 to the alternate image forming device in the operating mode.

This configuration can increase the probability of successful redirection of the print data 300 to alternate devices, thereby further reducing power consumption.

In addition, if there are no alternate devices returned to the operating mode even after the specific period of time has elapsed, the image forming device 1 brings itself into the operating mode to print out the data, thereby reliably printing the print data 300.

In the image forming device 1 according to the embodiment of the present disclosure, the alternate-device data transmission unit 120 refers to alternate-device data transmission authorization information 301 that is contained in the print data 300 and indicates whether to permit transmission of the print data 300 to the alternate device and to transmit the print data 300 only when the alternate-device data transmission authorization information 301 permits the transmission.

This configuration allows highly confidential print data 300 that should not be transferred to alternate devices to be printed out from the image forming device 1 with reliability. Therefore, a high level of security can be secured.

Although the image forming device 1 having temporarily stored print data 300 determines whether the alternate device that has responded to the broadcast inquiry has required print capabilities in the embodiment of the disclosure, the present disclosure is not limited thereto.

For example, the control unit 10 of an alternate device in the operating mode can receive alternate-device data transmission authorization information 301 from the image forming device that has broadcast through the operating information transmission/reception unit 130, to determine whether the alternate device has the required print capabilities, and to transmit the operating information 310 only when the alternate device has the required print capabilities.

This configuration can mitigate processing loads on the image forming device 1 and network loads and can reduce the cost.

Although the initial device and the alternate device have almost the same configuration in the aforementioned embodiment, the present disclosure is not limited thereto. Any image forming devices can be used as alternate devices if only the devices can make a response as described above and receive transferred print data 300. In this case, the alternate devices can convert the print data 300 into a format printable by themselves prior to transmission of the data.

The present disclosure can be applied to information processing devices in addition to the image forming devices. That is, the configuration can include a network scanner and a server additionally connected to a scanner via a USB or the like.

The above configuration and operation are merely examples and may be appropriately modified for implementation without departing from the scope of the present disclosure.

For example, in addition to the image forming devices, peripheral devices that operate or provide a specific services in response to request from a terminal connected via a network can be adopted as the peripheral devices of the disclosure.

Figure 9:
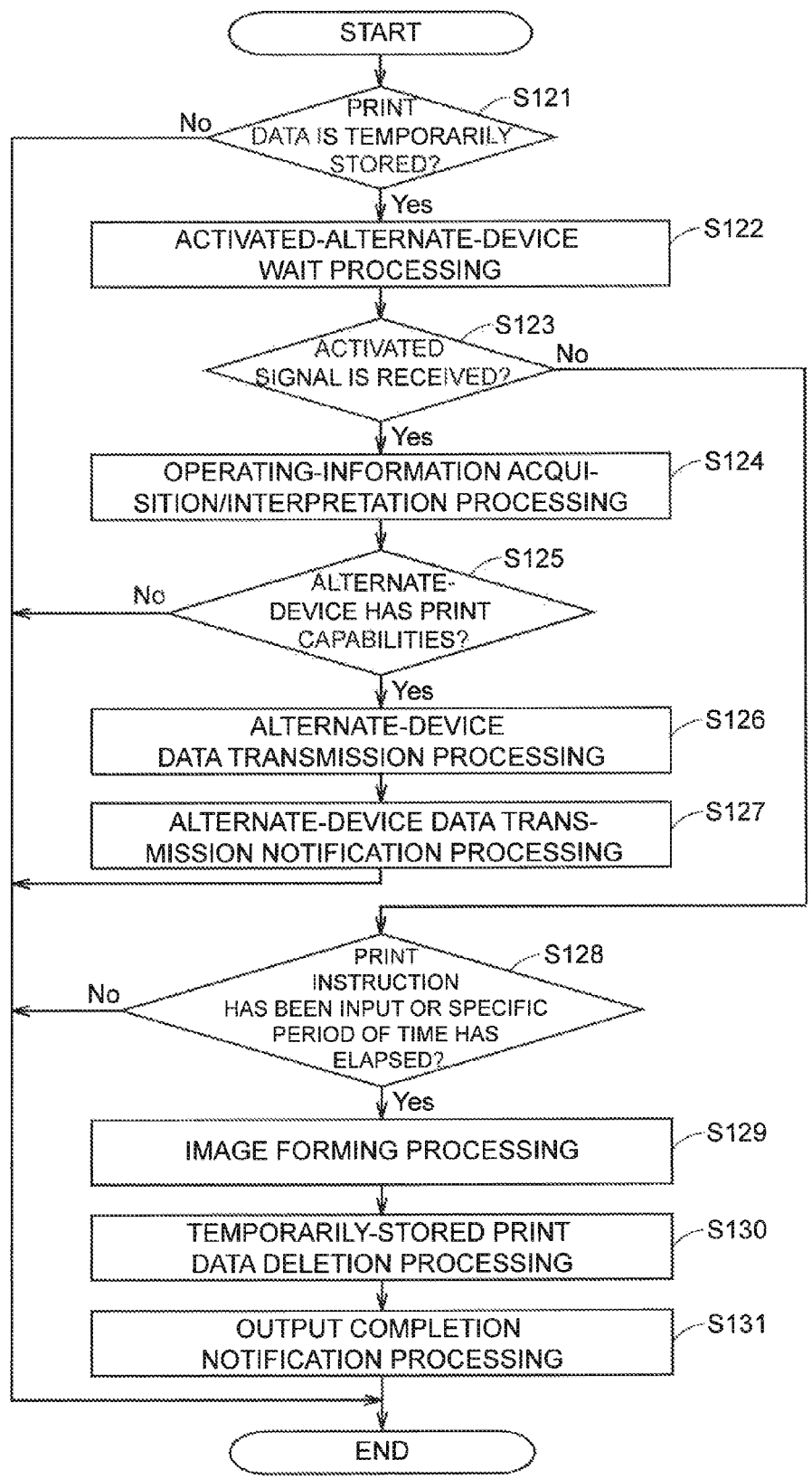
FIG. 9 illustrates a process of activated-alternate-device data transmission/output processing according to the embodiment of the disclosure.
Figure 10:
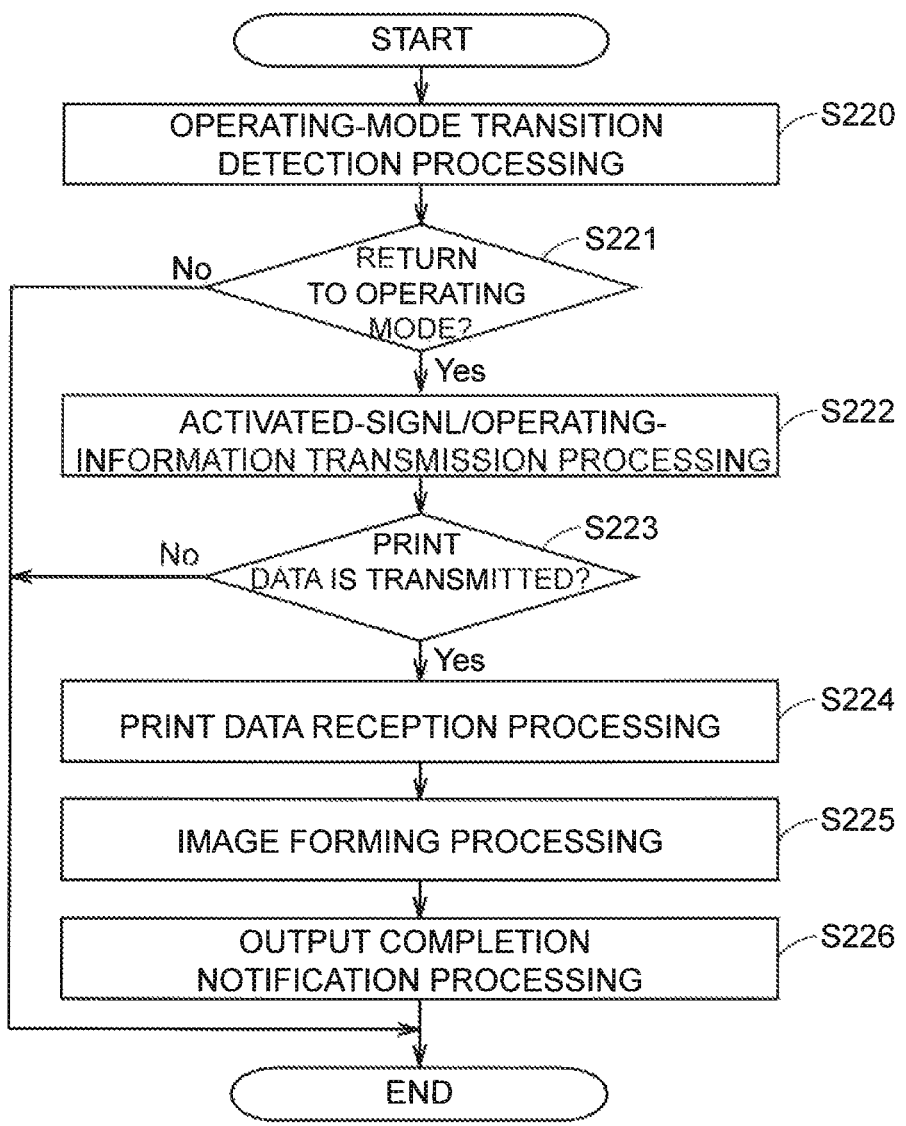
FIG. 10 illustrates a process of alternate-device activation/print processing according to the embodiment of the disclosure.

If there are some alternate devices determined as having the required print capabilities at step S109 in FIG. 5 and at step S125 in FIG. 9, the control unit 10 can choose any one of the alternate devices in an order of particular precedence (e.g., in increasing order of distance of the alternate device).

Furthermore, the alternate-device data transmission authorization information 301 can include information regarding a range of directions and the presence or absence of obstacles (walls, doors, etc.) in addition to a distance range defining the neighborhood of the initial device.

What is claimed is:

1. A peripheral device connectable to a terminal via a network, comprising:
   an alternate-device search unit that searches for an alternate peripheral device in an operating mode in the neighborhood of the peripheral device when the peripheral device is in a power saving mode upon receiving data to be processed from the terminal;
   an alternate-device data transmission unit that, when the alternate-device search unit locates the alternate peripheral device in the operating mode, transmits the data to be processed to the alternate peripheral device; and
   an alternate-device data transmission notification unit that notifies the terminal that the alternate-device data transmission unit has transmitted the data to be processed to the alternate peripheral device.

2. The peripheral device according to claim 1, further comprising:
   a temporary data storage unit that, when the alternate-device search unit cannot locate the alternate peripheral device in the operating mode, stores the data to be processed for a specific period of time, wherein
   when the alternate-device data transmission unit receives a notification that the alternate peripheral device in the neighborhood of the peripheral device has returned to the operating mode within the specified period of time, the alternate-device data transmission unit transmits the data to be processed stored in the temporary data storage unit to the alternate peripheral device returned to the operating mode.

3. The peripheral device according to claim 1, wherein
   the data to be processed contains alternate-device data transmission authorization information indicating whether transmission of the data to the alternate peripheral device is permitted, and
   the alternate-device data transmission unit refers to the alternate-device data transmission authorization information and transmits the data to be processed to the alternate device only when the alternate-device data transmission authorization information permits transmission.

4. A non-transitory computer-readable recording medium on which is recorded a data processing program to be executed by a peripheral device connectable to a terminal via a network,
   the data processing program comprising:
   a first program code that causes the computer to search for an alternate peripheral device in an operating mode in the neighborhood of the peripheral device when the peripheral device is in a power saving mode upon receiving data to be processed from the terminal;
   a second program code that, when the alternate peripheral device in the operating mode is found, causes the computer to transmit the data to be processed to the alternate peripheral device; and
   a third program code that causes the computer to notify the terminal that the data to be processed has been transmitted to the alternate peripheral device.

5. A data processing method executed by a peripheral device connectable to a terminal via a network, comprising the steps of:
   Searching, via an alternate-device search unit, for an alternate peripheral device in an operating mode in the neighborhood of the peripheral device when the peripheral device is in a power saving mode upon receiving data to be processed from the terminal;
   when the alternate device search unit locates the alternate peripheral device in the operating mode, transmitting, via an alternate-device data transmission unit, the data to be processed to the alternate peripheral device; and
   notifying, via an alternate-device data transmission notification unit, the terminal that the alternate-device data transmission unit has transmitted the data to be processed to the alternate peripheral device.

\* \* \* \* \*